(12) United States Patent
Pankanti et al.

(10) Patent No.: US 11,704,165 B2
(45) Date of Patent: Jul. 18, 2023

(54) PERSISTENTLY AVAILABLE CONTAINER SERVICES THROUGH RESURRECTION OF USER JOBS IN NEW COMPUTE CONTAINER INSTANCES DESIGNATED AS LEAD INSTANCES

(71) Applicant: International Business Machines Corporation, Armonk, NY (US)

(72) Inventors: Sharathchandra Pankanti, Fairfield County, CT (US); Nadiya Kochura, Bolton, MA (US); Tomas Krojzl, Brno (CZ); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 17/203,080

(22) Filed: Mar. 16, 2021

(65) Prior Publication Data
US 2022/0300343 A1 Sep. 22, 2022

(51) Int. Cl.
G06F 9/46 (2006.01)
G06F 9/50 (2006.01)
G06F 9/48 (2006.01)

(52) U.S. Cl.
CPC .......... *G06F 9/5083* (2013.01); *G06F 9/4881* (2013.01); *G06F 9/505* (2013.01);
(Continued)

(58) Field of Classification Search
CPC .... G06F 9/5083; G06F 9/4881; G06F 9/5038; G06F 9/505; G06F 9/5073; G06F 9/5072; G06F 9/5077; G06F 9/5027
See application file for complete search history.

(56) References Cited

U.S. PATENT DOCUMENTS 8,468,548 B2 6/2013 Kulkarni
9,106,537 B1 8/2015 Emelyanov
(Continued)

FOREIGN PATENT DOCUMENTS

CN 108628613 A 10/2018
CN 105743995 B 10/2019

OTHER PUBLICATIONS

"Job", Kubernetes, Aug. 10, 2020.
(Continued)

*Primary Examiner* — Michael W Ayers
(74) *Attorney, Agent, or Firm* — Steven M. Bouknight

(57) ABSTRACT

A method makes container services persistently available. A computing device receives a request for implementation of a user job in a container environment, and assigns the user job to a compute runner agent of a plurality of compute runner agents to execute the user job. Each compute runner agent is associated with a compute container instance having a unique compute container identifier corresponding to the user job. A computing device assigns the user job to a balancer task to monitor progress of the user job, and assigns the user job to a storage agent to store artifacts associated with running the user job. A computing device receives a notification from the balancer task describing whether the runner agent is correctly running the user job. In response to the runner agent incorrectly running the user job, a computing device resurrects the user job in a new compute container instance.

20 Claims, 15 Drawing Sheets

(52) U.S. Cl.
CPC .......... G06F 9/5038 (2013.01); G06F 9/5072 (2013.01); G06F 9/5077 (2013.01); *G06F 9/5027* (2013.01)

(56) References Cited

U.S. PATENT DOCUMENTS

| | | | |
|---|---|---|---|
| 9,135,269 | B2 | 9/2015 | Shetty |
| 9,141,433 | B2 | 9/2015 | Doyle |
| 10,158,726 | B2 | 12/2018 | Chou |
| 10,264,071 | B2 | 4/2019 | Pradeep |
| 10,474,544 | B1* | 11/2019 | Li .................. G06F 11/0709 |
| 10,613,914 | B2 | 4/2020 | Carlen |
| 2014/0047341 | A1* | 2/2014 | Breternitz ............ G06F 16/23 715/735 |
| 2016/0205518 | A1* | 7/2016 | Patel ..................... H04W 4/08 455/518 |
| 2018/0157560 | A1 | 7/2018 | Gochkov |
| 2018/0225155 | A1* | 8/2018 | Watt, Jr. ............... G06F 9/5083 |
| 2019/0102265 | A1 | 4/2019 | Ngo |
| 2021/0097444 | A1* | 4/2021 | Bansal ................. G06F 9/5066 |
| 2022/0171653 | A1* | 6/2022 | Rj ........................ G06F 9/505 |

OTHER PUBLICATIONS

"Planning highly available persistent storage", IBM, Kubernetes Service, Aug. 24, 2020.
Ali Kanso et al., "Can Linux Containers Clustering Solutions offer High Availability", IBM, 2016.
Amazon, "Service load balancing", Sep. 3, 2020.
Leila Abdollahi Vyghan et al., "Microservice Based Architecture: Towards High-Availability for Stateful Applications with Kubenetes", IEEE, Jul. 26, 2019.
P. Mell et al., "The Nist Definition of Cloud Computing", National Institute of Standards and Technology, Information Technology Laboratory, Sep. 2011, pp. 1-7.
Rosa, Denis. "Databases on kubernets", Couchbase, May 25, 2018.
Statefulset, "Run a Replicated Stateful Application using StatefulSet", Kubernetes, Last modified Feb. 11, 2021.
Velotio, "Demystifying High Availability in Kubernetes Using Kubeadm", Jan. 17, 2019.
Wubin Li et al., "Leveraging Linux Containers to Achieve High Availability for Cloud Services", 2015 IEEE International Conference on Cloud Computing, 2015.

* cited by examiner

US 11,704,165 B2

PERSISTENTLY AVAILABLE CONTAINER SERVICES THROUGH RESURRECTION OF USER JOBS IN NEW COMPUTE CONTAINER INSTANCES DESIGNATED AS LEAD INSTANCES

BACKGROUND

One or more embodiments of the present invention relate to container services. Still more specifically, one or more embodiments of the present invention relate to making container services persistently available to a user job that is operating in a container environment.

A container is a unit of software that interfaces with and bundles binaries, libraries, code, runtime, system tools, system libraries, settings, and other software resources needed to run an application into a single package. As such, a container provides an interface to a user, allowing the user to use the container to quickly and reliably deploy the software resources on different computing environments.

However, if a particular container becomes corrupted or otherwise fails, intermediary outputs from the application that is supported by that container are no longer available to that particular container. One or more embodiments of the present invention address this and/or other issues to which the prior art does not provide a solution.

SUMMARY

In one or more embodiments of the present invention, a method makes container services persistently available to a user job. A computing device receives a request for implementation of a user job in a container environment, and assigns the user job to a compute runner agent of a plurality of compute runner agents to execute the user job. Each compute runner agent is associated with a compute container instance having a unique compute container identifier corresponding to the user job. A computing device assigns the user job to a balancer task to monitor progress of the user job, where the balancer task is associated with the container instance, and assigns the user job to a storage agent to store artifacts associated with running the user job, where the storage agent is associated with the compute container instance. A computing device receives a notification from the balancer task describing whether the runner agent is correctly running the user job. In response to the notification stating that the runner agent is incorrectly running the user job, A computing device resurrects the user job in a new compute container instance.

In one or more embodiments of the present invention, a computing device determines that all tasks for the user job are complete. In response to determining that all tasks for the user job are complete, a computing device communicates a task completion status message to the compute runner agent. A compute runner agent consolidates all artifacts of the plurality of compute runner agents from a session associated with a user job, where consolidating the artifacts spans a spectrum of choices from promotion of all of the artifacts to only one artifact. In response to consolidating the artifacts, a computing device communicates a notice of the completion of the user job to all users of the container environment that was used by the user job.

In one or more embodiments of the present invention, a computing device assigns two or more sessions having multiple roles to a single compute container. A computing device determines that all of the two or more sessions have ended, and directs leader agents for the user job to terminate all follower agents of the leader agents. In response to terminating all follower agents of the leader agents, a computing device deletes all data artifacts created by the leader agents. In response to determining that all of the two or more sessions have ended, a computing device stores a record of all transactions performed for the user job.

In one or more embodiments of the present invention, one or more compute load balancers identify one or more compute runner agents for the user job that terminated before the user job completed. A computing device then resurrects all terminated compute runner agents that terminated before the user job completed from a last known state of the user job.

In one or more embodiments, the method(s) described herein are performed by an execution of a computer program product.

DETAILED DESCRIPTION

Figure 1:
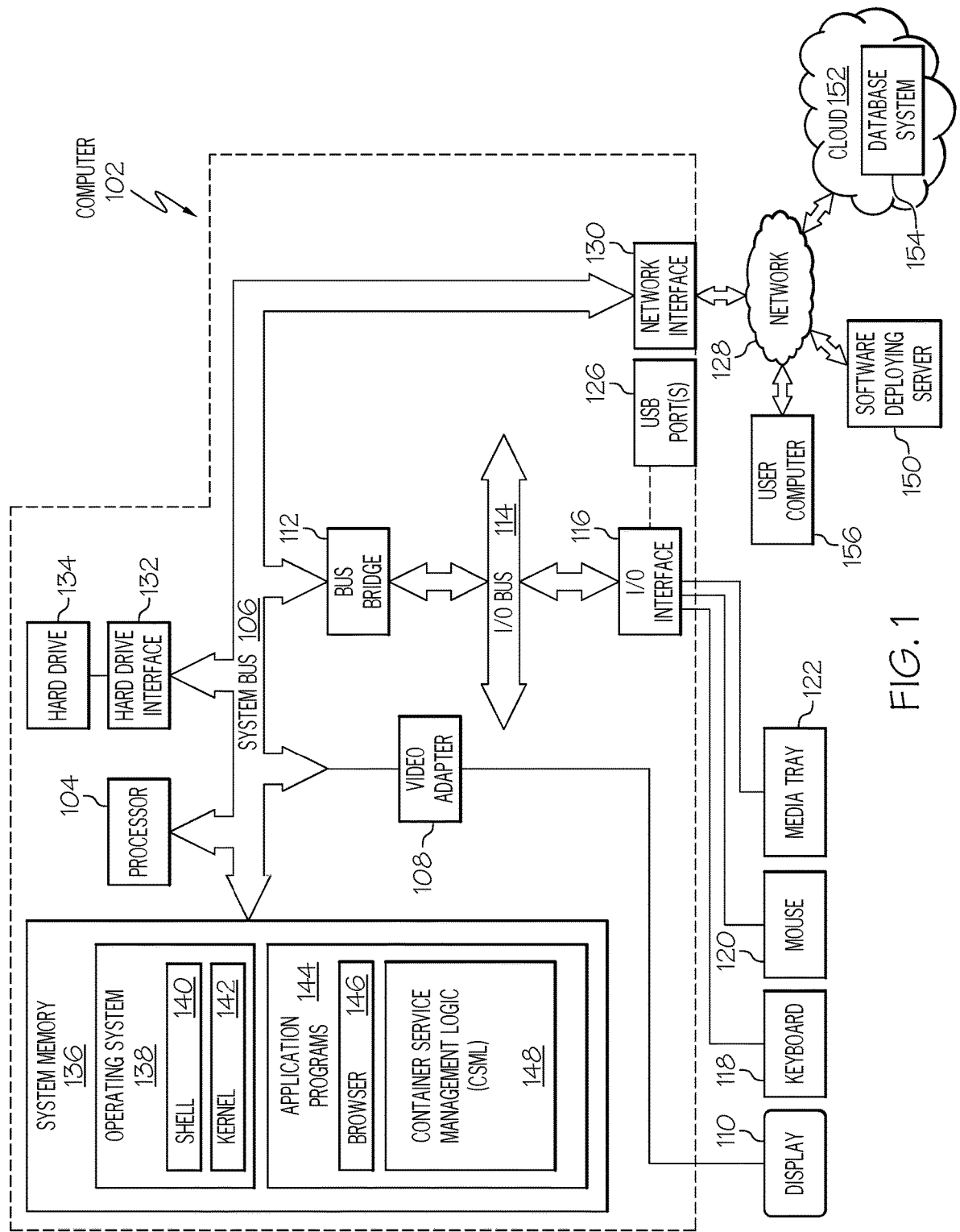
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

A container is a unit of software that interfaces with and bundles binaries, libraries, code, runtime, system tools, system libraries, settings, and other software resources needed to run an application into a single package. This container packages up code and resources so the application is able to be quickly and reliably deployed on different computing environments.

In one or more embodiments of the present invention, the container does not actually contain binaries, libraries, code, runtime, system tools, system libraries, settings, etc., but rather contains addresses in a distributed system (e.g., a cloud) at which such resources reside. As such, a container can be viewed as an interface to such resources. Nonetheless, containers described herein will be discussed as holding, including, containing, etc. such resources, even when they do not physically hold such resources.

Since containers include persistent data (e.g., intermediary outputs from the application that is using the container during runtime), backup and recovery of such persistent data is needed, in case the container becomes lost or corrupted.

In systems such as KUBERNETES® (KUBERNETES is a registered trademark of The Linux Foundation Non-profit corporation in the United States and/or other countries), storage of stateful computations, such as those found in a database management system (DBMS), is problematic, due to the architecture of a container environment, particularly where the container is operating in a hybrid cloud context that combines local storage and cloud-based storage.

Thus, and as described herein, one or more embodiments of the present invention presents a new paradigm for providing higher availability and resiliency of container resources through the use of loosely coupled concurrency and redundancy of such container resources.

With reference now to the figures, and in particular to FIG. 1, there is depicted a block diagram of an exemplary system and network that may be utilized by and/or in the implementation of one or more embodiments of the present invention. Note that some or all of the exemplary architecture, including both depicted hardware and software, shown for and within computer 102 may be utilized by software deploying server 150 and/or cloud 152 and/or database system 154 and/or remote user computer 156 shown in FIG. 1, and/or host computer 202 shown in FIG. 2, and/or user computer 356 and/or various components of multi-architecture cloud 352 shown in FIG. 3.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a network 128 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, one or more embodiments of the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory also include a Container Service Management Logic (CSML) 148. CSML 148 includes code for implementing the processes described below, including those described in FIGS. 2-13. In one or more embodiments of the present invention, computer 102 is able to download CSML 148 from software deploying server 150, including in an on-demand basis, wherein the code in CSML 148 is not downloaded until needed for execution. Note further that, in one or more embodiments of the present invention, software deploying server 150 performs all of the functions associated with the present invention (including execution of CSML 148), thus freeing computer 102 from having to use its own internal computing resources to execute CSML 148.

As noted above, computer 102 is able to communicate with other resources via network 128. For example, assume that computer 102 is functioning as a computing device that coordinates one or more features presented in the present invention. As such, computer 102 is able to communicate, via network 128, to software deploying server 150, a cloud 152 and the database system 154 within that cloud environment, and a user computer 156 (e.g., that sends an application to a database system, such as that shown in FIG. 4).

In one or more embodiments of the present invention, cloud 152 is a collection of on-demand computing resources, such as data storage devices and computing devices, which are physical devices and/or virtual (emulated) devices. These on-demand computing resources appear as physical, and even local, devices to a client computer, even though they are actually remote and/or emulated. In one or more embodiments of the present invention, cloud 152 also includes software resources, including databases, applications, operating systems, etc., which are also available to a client computer in an on-demand manner.

As such, in one or more embodiments of the present invention, cloud 152 includes an on-demand database system 154, which provides a database management system (DBMS), which includes software that allows an end user to interact with database applications and databases themselves, in order to store, retrieve, and/or analyze data that is within the database.

Note that the hardware elements depicted in computer 102 are not intended to be exhaustive, but rather are representative to highlight essential components required by one or more embodiments of the present invention. For instance, computer 102 may include alternate memory storage devices such as magnetic cassettes, digital versatile disks (DVDs), Bernoulli cartridges, and the like. These and other variations are intended to be within the spirit and scope of the present invention.

As described herein, one or more embodiments of the present invention utilized a container environment, such as that provided by DOCKER® engine (DOCKER is a registered trademark of Docker, Inc. in the United States and/or other countries), which utilize an intermediary engine.

Unlike a virtual machine, in which a guest operating system in the virtual machine interfaces with a hypervisor for a host computer, DOCKER utilizes the host OS, which resides on the host computer, through the use of containers and a DOCKER engine. That is, in a DOCKER architecture, a container (made up of an application along with binaries/libraries required by the application) interface with the DOCKER engine, which provides an interface with the host OS of the host computer. The container and the DOCKER engine collectively make up a "pod", which is a self-contained infrastructure for executing the application by using the host OS on the host computer.

Figure 2:
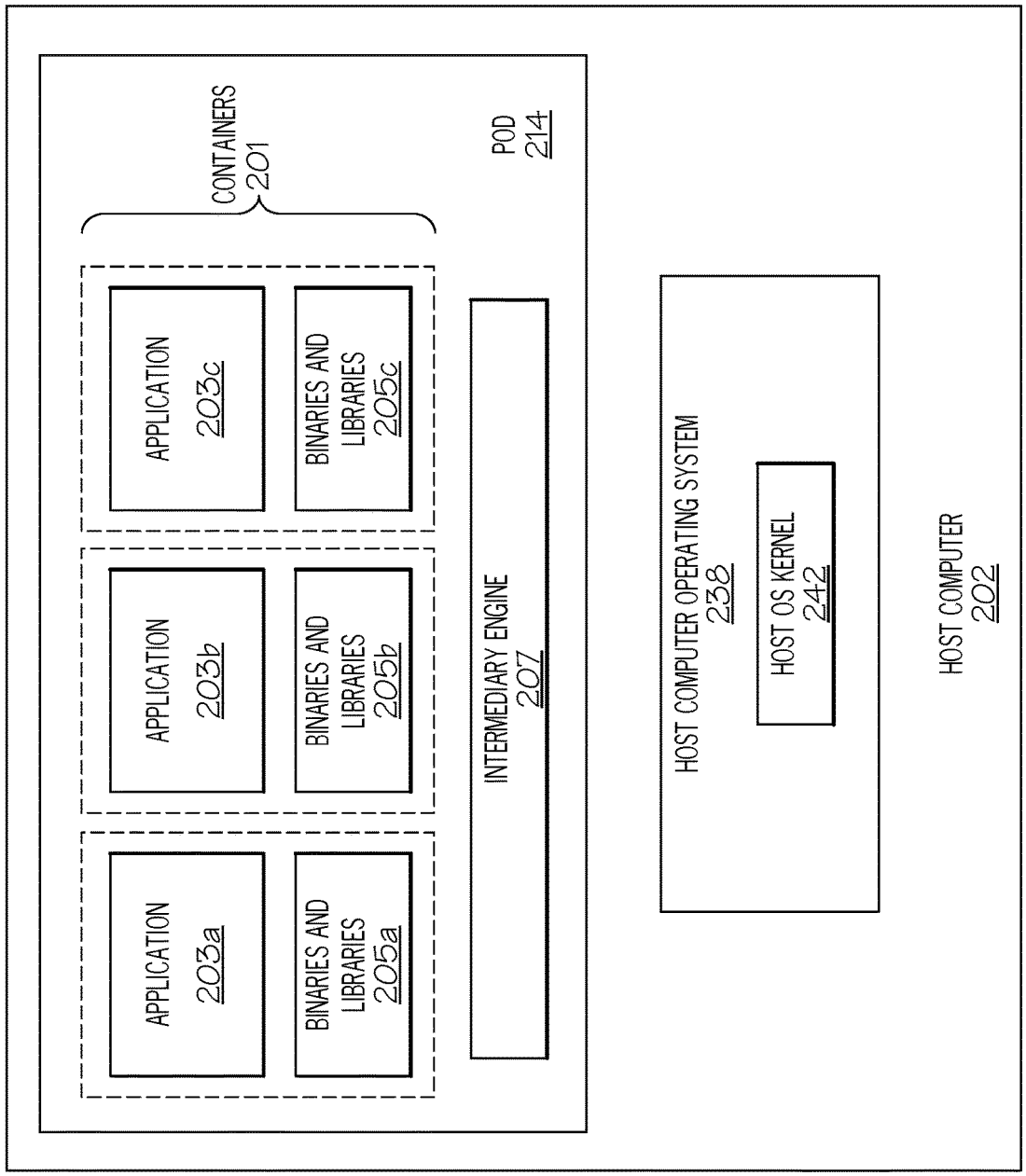
FIG. 2 illustrates an exemplary container environment in which one or more embodiments of the present invention operate.

With reference then to FIG. 2, an exemplary DOCKER pod as used in one or more embodiments of the present invention is illustrated as pod 214. As depicted in FIG. 2, assume that pod 214 is running on a host computer 202 (which is architecturally analogous to computer 102 shown in FIG. 1). Host computer 202 has its own host computer operating system (OS) 238 (analogous to OS 138 shown in FIG. 1). The host computer OS 238 includes a host OS kernel 242 (analogous to kernel 142 shown in FIG. 1). The host computer 202 includes a processor, system memory, input/output devices, storage devices, etc., as shown for computer 102 in FIG. 1 but not depicted in FIG. 2, which are accessed/managed/controlled by the host OS kernel 242. These resources are either physical or virtual (emulated in software).

The host computer OS 238 interfaces with an intermediary engine 207, which in a DOCKER environment is called a DOCKER engine. An "intermediary engine" is defined as a software structure that provides an interface, between one or more applications and a host operating system, which enables the one or more applications to run on the host operating system.

Thus, and as shown in FIG. 2, intermediary engine 207 provides an interface between the host computer OS 238, including the host OS kernel 242, and one or more applications, depicted as application 203a, application 203b, and application 203c. Each of the applications has an associated set of binaries (i.e., various files used by an application) and libraries (i.e., pre-written code and subroutines used by the application). Thus, the containers 201 shown in FIG. 2 includes application 203a paired with binaries/libraries 205a; application 203b paired with binaries/libraries 205b; application 203c paired with binaries/libraries 205c; and so on if additional applications are running on the intermediary engine 207. The intermediary engine 207 provides a structure that allows one or more of the containers 201 to interact with the host OS 238, in order to execute on the host computer 202. In a DOCKER system, multiple pods can operate on a same host computer (e.g., host computer 202), which in a DOCKER architecture is called a node. A node can be a worker node (which provides the architecture that executes the pod) or a lead node (which manages one or more worker nodes).

Figure 4:
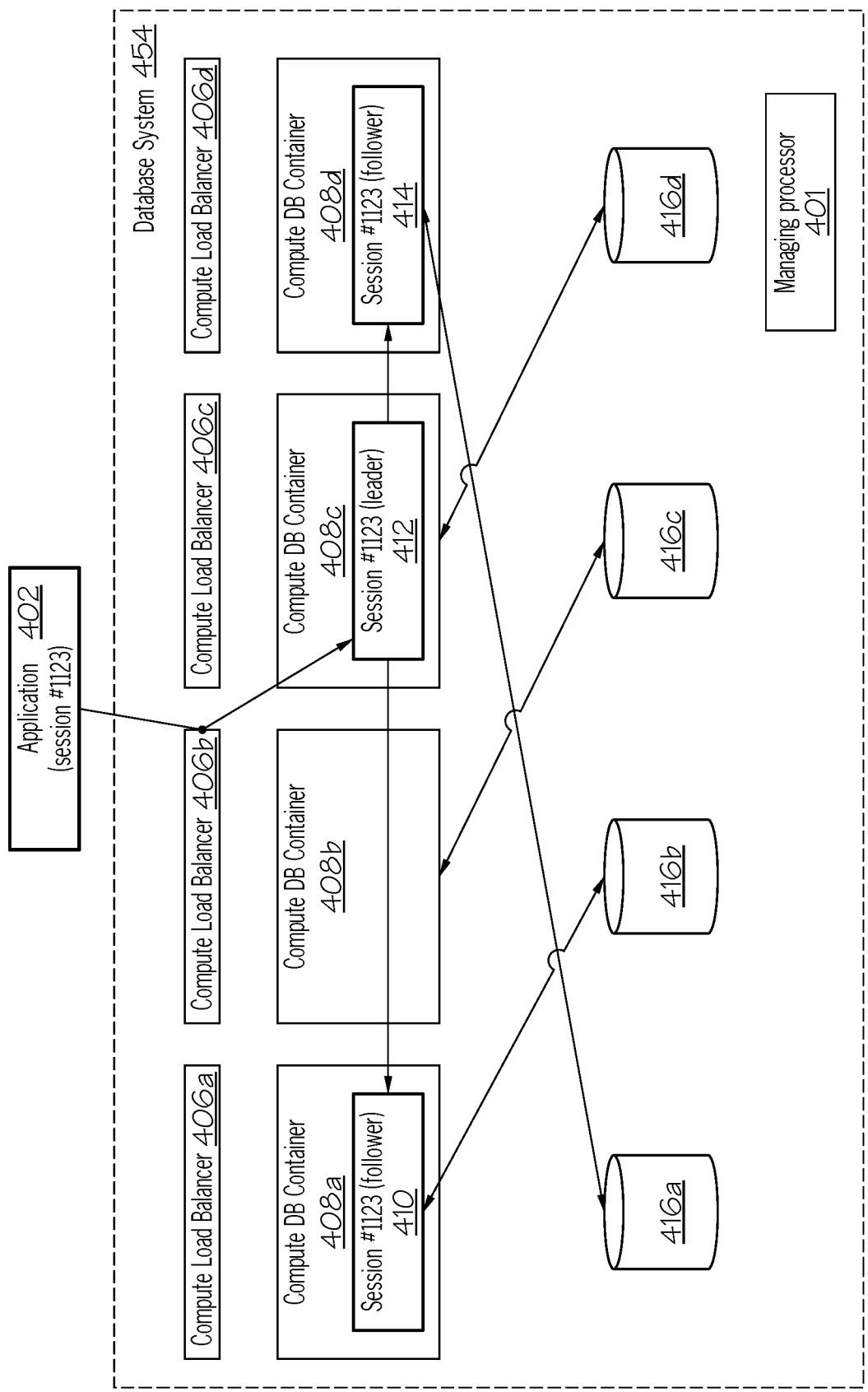
FIG. 4-FIG. 11 depict a new paradigm for providing higher availability and resiliency of container resources by use of loosely coupled concurrency and redundancy in accordance with one or more embodiments of the present invention.

In one or more embodiments of the present invention, applications 203a-203c provide processing features for analyzing data, and thus provide the backbone architecture for the compute DB containers 408a-408d shown in FIG. 4.

Figure 7:
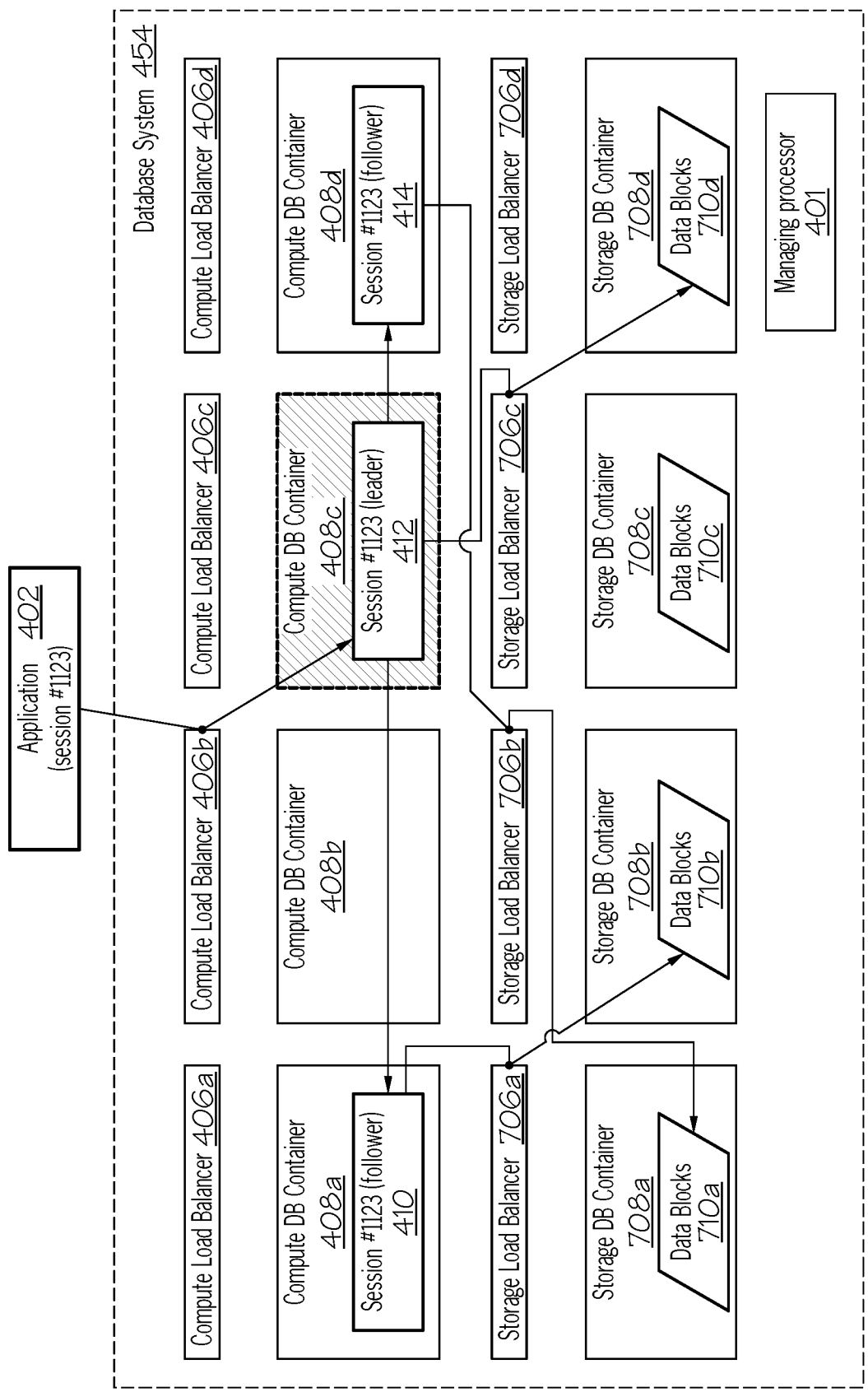

In one or more embodiments of the present invention, applications 203a-203c provide processing features for simply storing data, and thus provide a much simpler backbone architecture for the storage DB containers 708a-708d shown in FIG. 7.

Figure 3:
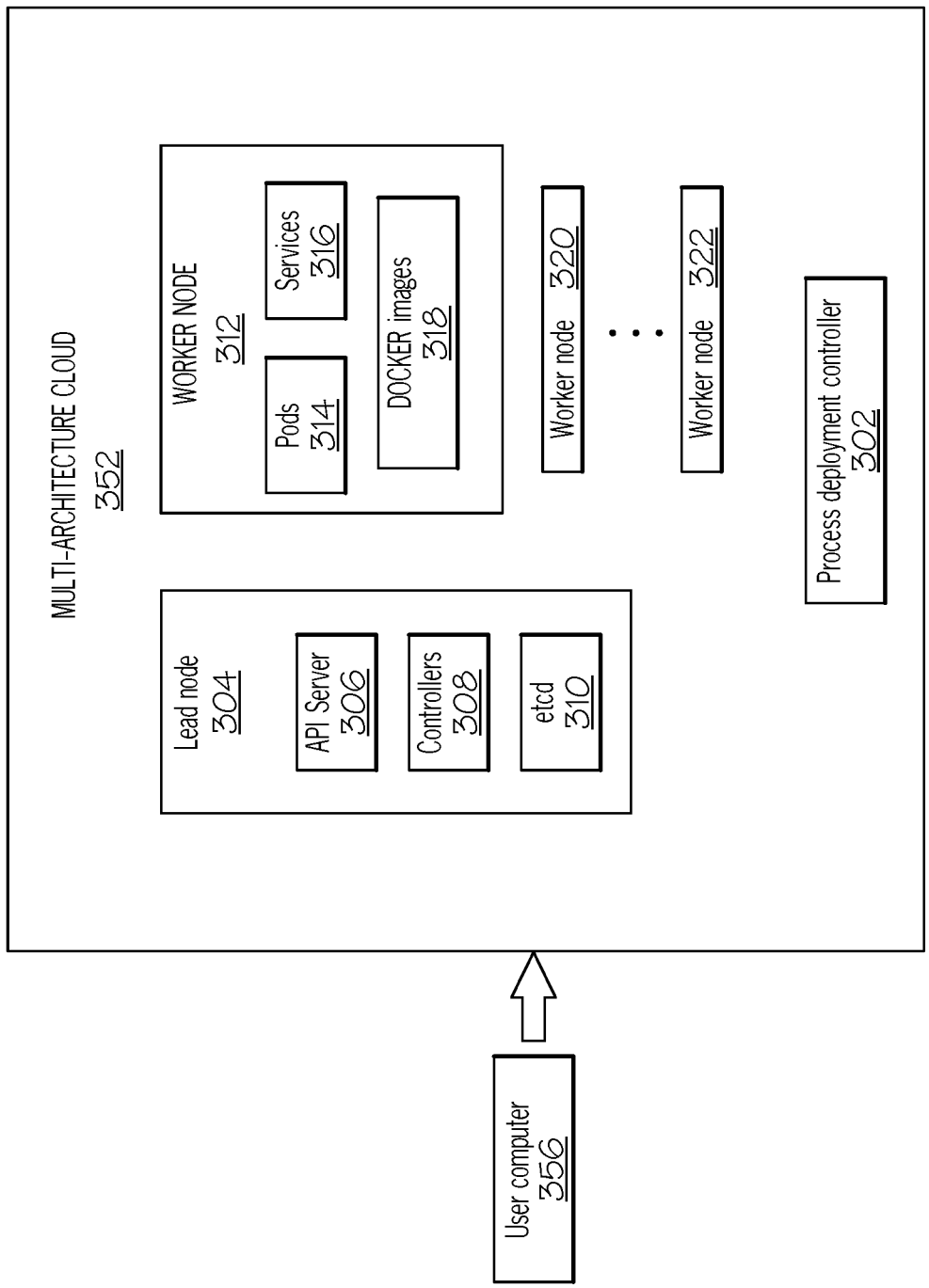
FIG. 3 depicts an exemplary multi-architecture cloud in which one or more embodiments of the present invention operate.

With reference now to FIG. 3, a multi-architecture cloud 300 containing a lead node 304 that manages multiple worker nodes, including exemplary worker node 312 (depicted in detail in FIG. 3), worker node 320, and worker node 322. Depicted worker node 320 and worker node 322, as well as other worker nodes that are not depicted in FIG. 3, utilize similar architectures as shown for worker node 312. Although three worker nodes are depicted in the multi-architecture cloud 300, it is understood that the multi-architecture cloud 300 can contain more or less than three worker nodes.

As the name implies, multi-architecture cloud 300 is capable of supporting nodes that have different architectures. That is, worker node 312 can have a first operating system that runs on a first type of processor, worker node 320 can have a second operating system (different from the first operating system) that runs on a second type of processor (different from the second type of processor), etc. As such, different intermediary/DOCKER engines are often needed for each of the nodes, since each intermediary/DOCKER engine is specifically written to interface with a particular OS/kernel for a particular type of processor.

Assume now that a user of user computer 356 (analogous to user computer 156 shown in FIG. 1) wants to deploy one or more applications in the multi-architecture cloud 352. The user computer 356 communicates with the lead node 304, which allows the user computer 356 to deploy applications to the worker nodes (e.g., worker node 312) for execution thereon.

In an embodiment of the present invention, the lead node 304 is architected as a KUBERNETES® node (KUBERNETES is a registered trademark of The Linux Foundation Non-profit corporation in the United States and/or other countries). KUBERNETES a system that deploys and manages containers across disparate types of infrastructure/architectures. One or more embodiments of the present invention utilizes KUBERNETES to deploy DOCKER engines, which enable containers to operate across nodes having disparate types of infrastructure/architectures.

In the embodiment in which the lead node 304 is a KUBERNETES node, the lead node 304 includes an application program interface (API) server 306, controllers 308, and etcd 310.

Thus, use of a KUBERNETES controller enables one or more embodiments of the present invention to customize a KUBERNETES deployment resource definition, in order to provide an image uniform resource locator (URL) to the KUBERNETES controller, where the image URL enables the KUBERNETES controller to retrieve the first updated image from an image registry. That is, once the first updated image is created, the KUBERNETES controller is able to use an image URL to retrieve that image (e.g., a DOCKER file) from the image registry.

The API server 306 serves APIs (i.e., functions and procedures) that are needed by the user computer 362 to access resources and data in the worker nodes.

Controllers 308 activate and deactivate worker nodes, load balance work among worker nodes, join required services to certain nodes, etc.

Etcd 310 is a distributed database that tracks which worker nodes are deployed and what containers are within each of the deployed worker nodes.

Within each of the worker nodes are one or more pods 314 (analogous to pod 214 shown in FIG. 2), services 316 (e.g., APIs used by the worker node, a user interface provided by the worker node to the lead node 304 for use by the user computer 356, etc.), and DOCKER images 318.

A DOCKER image, such as one or the DOCKER images 318 shown in FIG. 3, is created from a DOCKERFILE (i.e., a set of definitions for how the DOCKER image is to be defined), and provides a description of the infrastructure of the host computer system, including the host computer systems OS/kernel. The DOCKER image is used to interface with the host computer system, in order to create a pod, such as pod 214 shown in FIG. 2, that is able to interface with the host computer/host OS. As such, the DOCKER images 318 need to know about the infrastructure of the worker node 312 (e.g., host computer 202 shown in FIG. 2), including the types of resources (e.g., processor, memory, etc.) and/or the operating system (including the kernel) used by the worker node 312/host computer 202.

A process deployment controller 302 is software or a dedicated processor that monitors, manages, upgrades, downgrades, and scales pods (e.g., pod 214 shown in FIG. 2) without any disruption or downtime of the container process.

Figure 11:
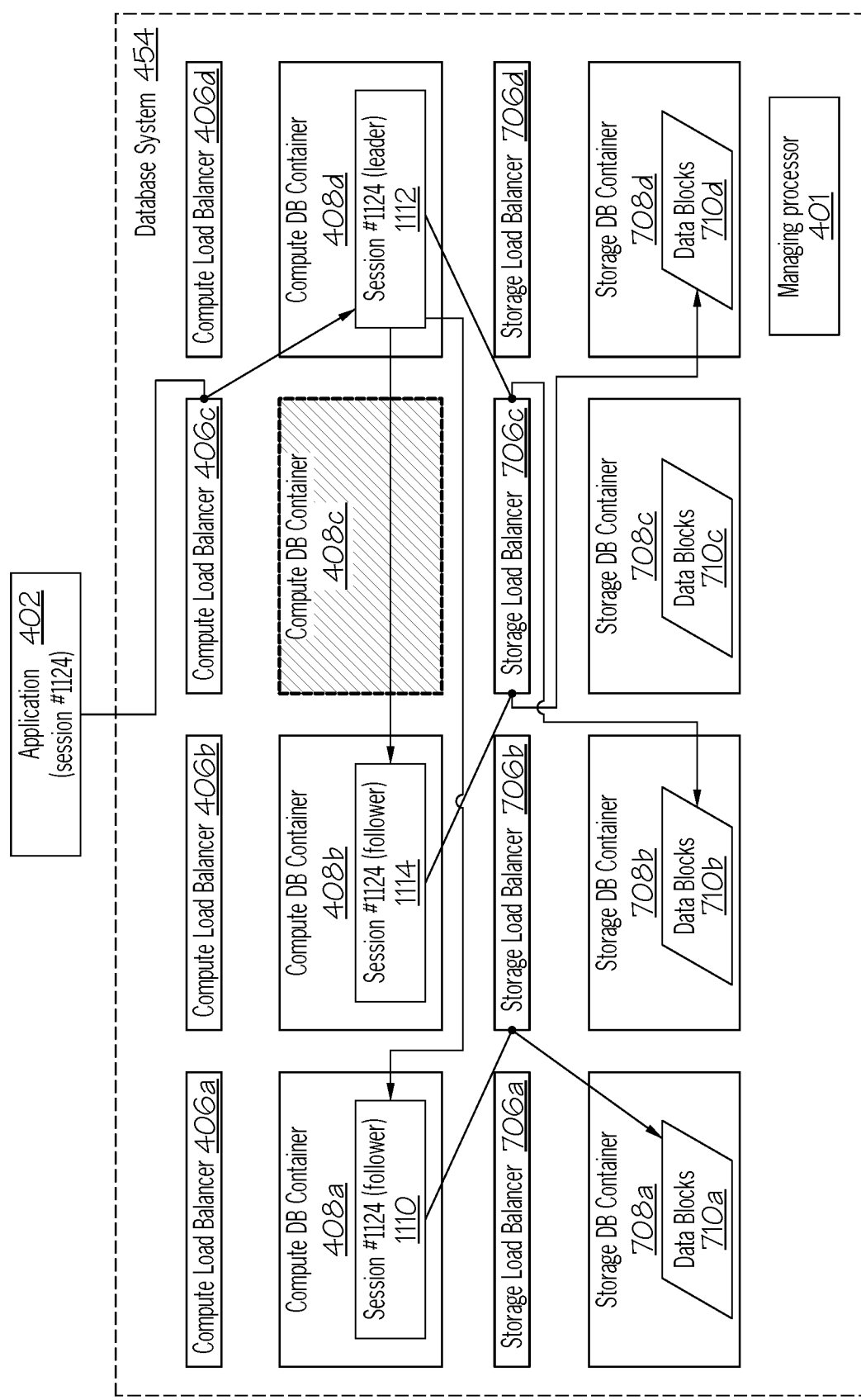

With reference now to FIG. 4 though FIG. 11, an overview of components and the use thereof in one or more embodiments of the present invention is presented.

As described in FIG. 4 through FIG. 11, each depicted container is associated with a runner agent, which identifies and tracks sessions, which container is used, etc. For example, compute runner agent 412 shown in FIG. 4 is associated with compute database container 408*c*, and compute runner agent 412 also functions as a storage runner agent for storage DB container 708*d* shown in FIG. 7. As such, in one or more embodiments of the present invention, this intertwining between a runner agent and a container leads to the terms "runner compute agent", "runner agent", "storage compute agent", "storage agent", and "container" (e.g., "compute DB container", "storage DB container") being interchangeable.

Similarly, the terms "container" and "container instance" are used interchangeably to describe a "container", which is described in detail above in FIG. 2.

As shown in FIG. 4, assume that an application 402, such as an application that is being executed on behalf of user computer 156 shown in FIG. 1, calls database system 454 (analogous to database system 154 shown in FIG. 1) to support application 402. For example, assume that application 402 requires data to be analyzed by database system 454, and thus accessed that database system 454 by using a computer load balancer, which in the example shown in FIG. 4 is one of the compute load balancers 406*a*-406*d*.

As such, compute load balancer 406*b* is being used as an initial interface between application 402 and database system 454.

As shown in FIG. 4, this communication between application 402 and database system 454 is via a communication/processing session, which is shown in FIG. 4 as session #1123.

The compute load balancer 406*b* then directs the request by application 402 for support to a compute database (DB) container 408*c*, which is one of the depicted compute DB containers 408*a*-408*d*.

A compute DB container provides an interface to all computation-related resources (processors, networks, buffers, etc.), physical or virtual, that are needed to retrieve, store, and/or analyze data found in the databases 416*a*-416*d*, which in one or more embodiments of the present invention are mirror/duplicate/replica images of one another.

As shown in FIG. 4, compute DB container 408*c* is identified as the session #1123 (leader) 412 for the session #1123 between the application 402 and the database system 454. The annotation "leader" indicates that session #1123 (leader) 412 (i.e., compute DB container 408*c*) is in charge of session #1123, such that session #1123 (follower) 410 (i.e., compute DB container 408*a*) and session #1123 (follower) 414 (i.e., compute DB container 408*d*) will 1) take their instructions from session #1123 (leader) 412, and 2) mirror the state (e.g., current instruction being executed in programs running in compute DB container 408*c*, buffer contents in buffers in virtual machines (VMs) running in compute DB container 408*c*, register contents of registers in a core of VMs running in compute DB container 408*c*, etc.). Thus, if compute DB container 408*c* fails, then compute DB container 408*d* or compute DB container 408*a* can take on the role of being the session #1123 (leader).

Furthermore, assume that each of the compute DB containers 408*a*-408*d* use a particular database from databases 416*a*-416*d*. Thus, if a particular compute DB container fails, then access to the database associated with that compute DB container is cut off.

In one or more embodiments of the present invention, a managing processor 401, which may be part of the database system 454 architecture or a remote processor (e.g., in computer 102 shown in FIG. 1), manages the operations of the components of the database system 454 shown in FIGS. 4-12.

Figure 5:
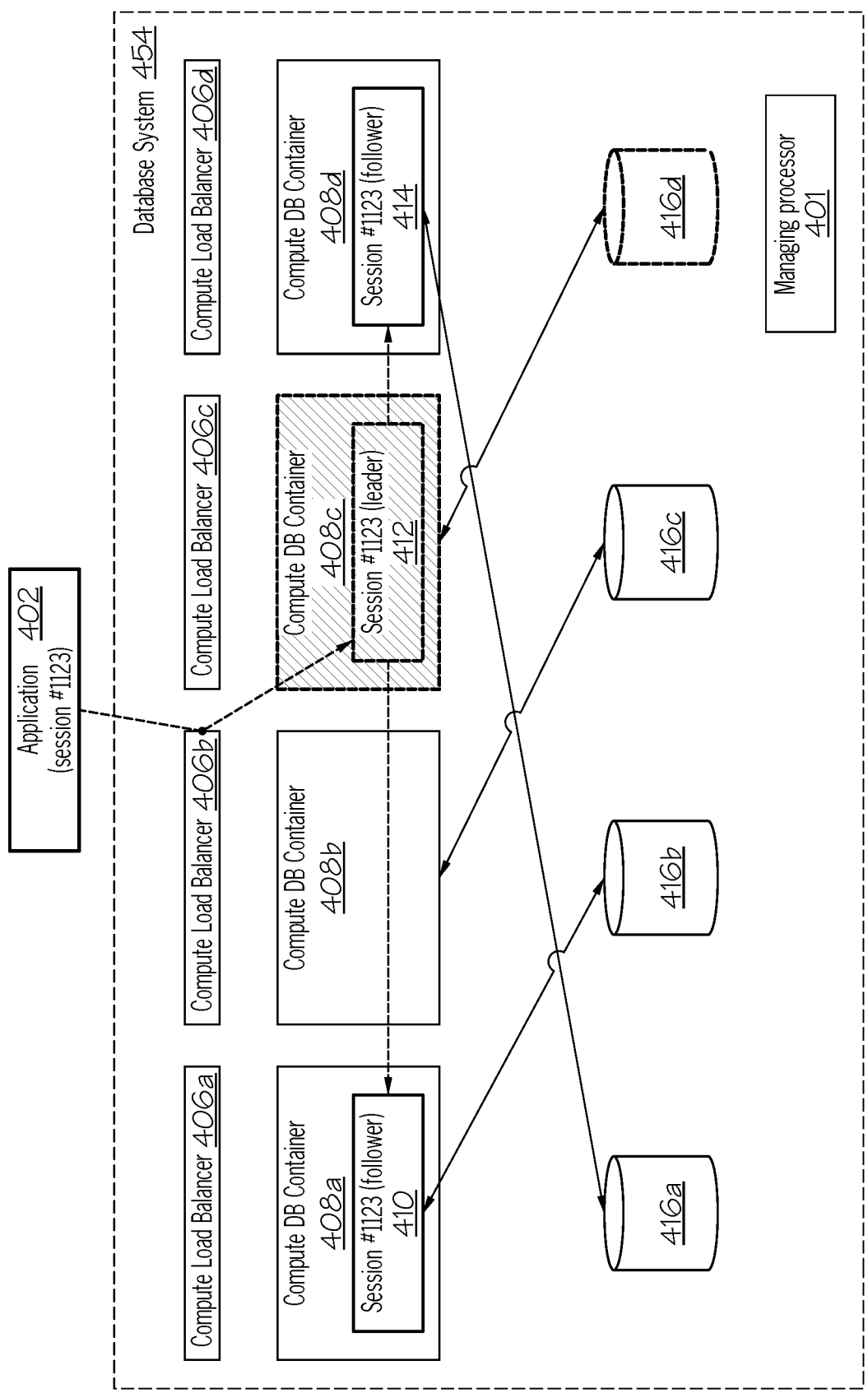

As shown in FIG. 5, assume that a failure of compute DB container 408*c* has occurred. This failure of compute DB container 408*c* 1) causes the session #1123 (leader) 412 to fail, and 2) causes access to database 416*d* to be cut off.

Figure 6:
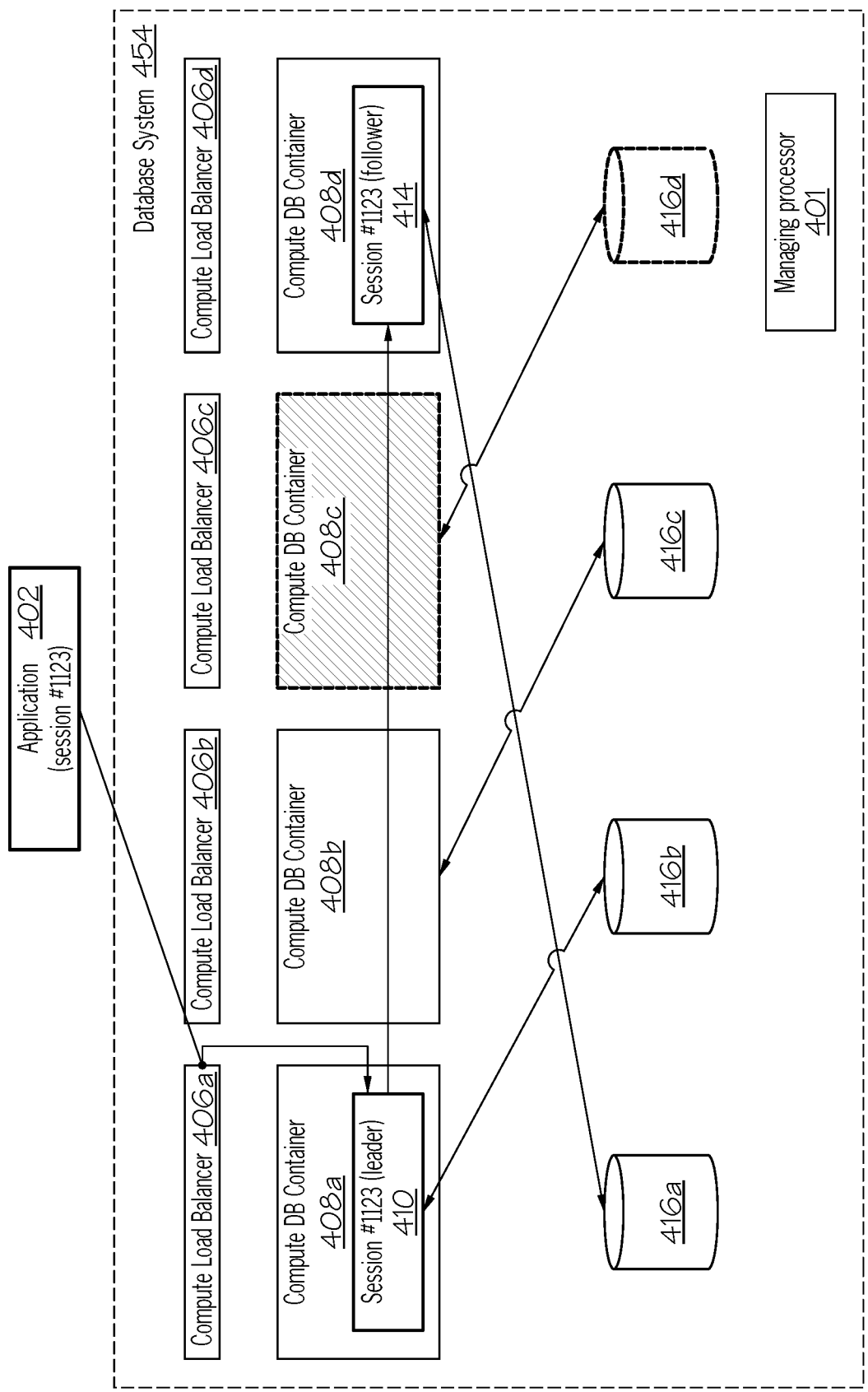

As shown in FIG. 6, since the session #1123 (follower) 410 and session #1123 (follower) 414 mirror the session #1123 (leader) 412, then either one can take over the role of session #1123 (leader) 412. That is, the session #1123 (follower) 410 is now the session leader (e.g., as directed by the managing processor 401), and is thus depicted as session #1123 (leader) 410. As such, session #1123 (leader) 410 now directs operations of session #1123 (follower) 414. However, the reconfiguration performed by the compute load balancer 406*b* shown in FIG. 6 does not provide access to database 416*d*, which is still active, but now cannot be accessed, due to the failure of compute DB container 408*c*.

With reference now to FIG. 7, additional detail of database system 454 is presented.

As shown in FIG. 7, access to databases 416*a*-416*d* shown in FIG. 4 is not directly provided to the compute DB containers 408*a*-408*d*, but rather is provided via storage load balancers 706*a*-706*d*. That is, just as compute load balancers 406*a*-406*d* provide access to compute DB containers 408*a*-408*d* (which perform the computational features of database system 454, such as analyzing data, looking for trends, organizing data, etc.), storage load balancers 706*a*-706*d* store and provide access to data blocks 710*a*-710*d*, which are data blocks relevant to the operations of application 402 and the compute DB containers 408*a*-408*d*.

As shown in FIG. 7, the compute DB container 408*c* has failed.

Figure 8:
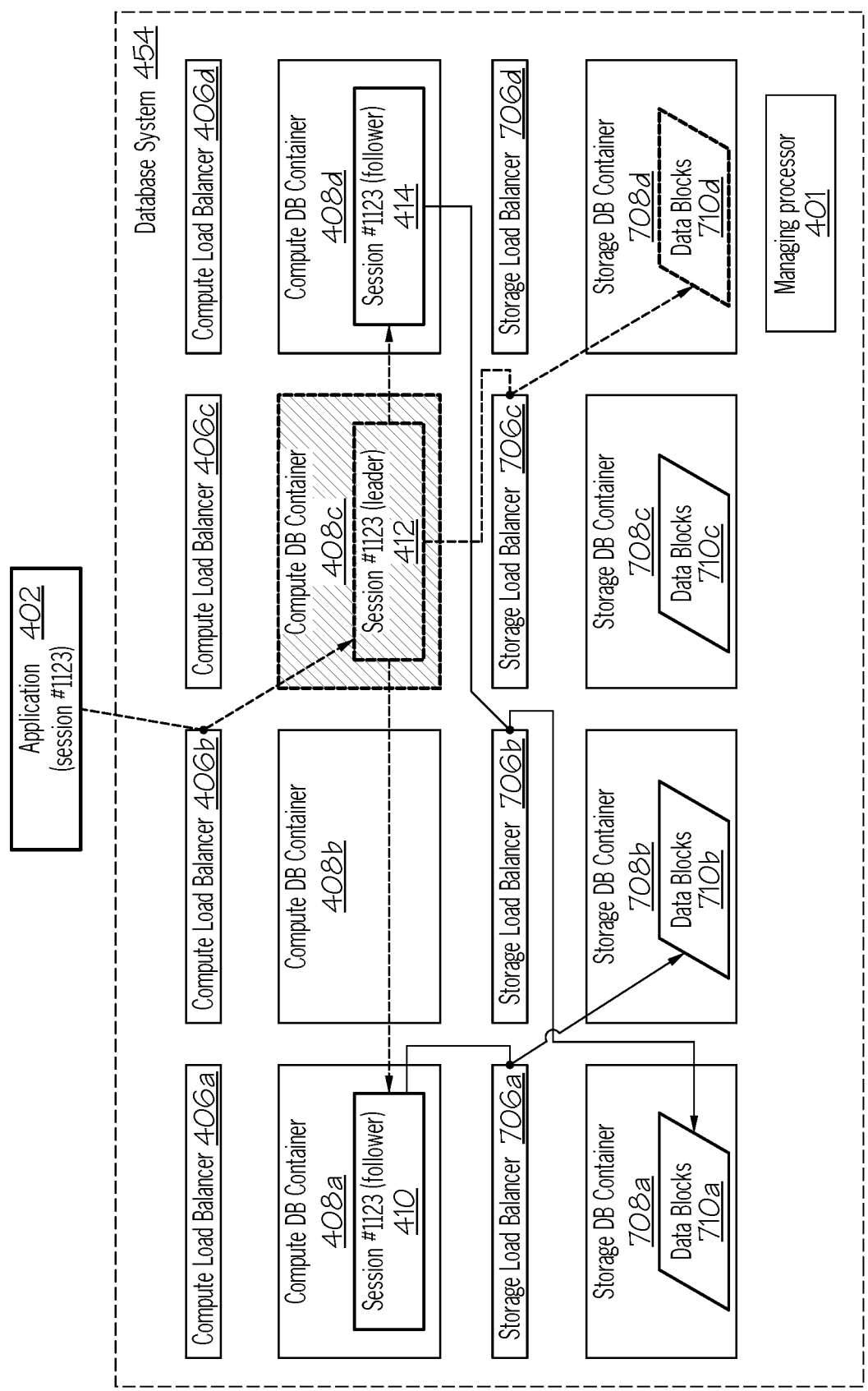

As such, and as shown in FIG. 8, this causes the session #1123 (leader) 412 to fail, thereby cutting off access to the data blocks 710*d* provided by storage DB container 708*d*.

Figure 9:
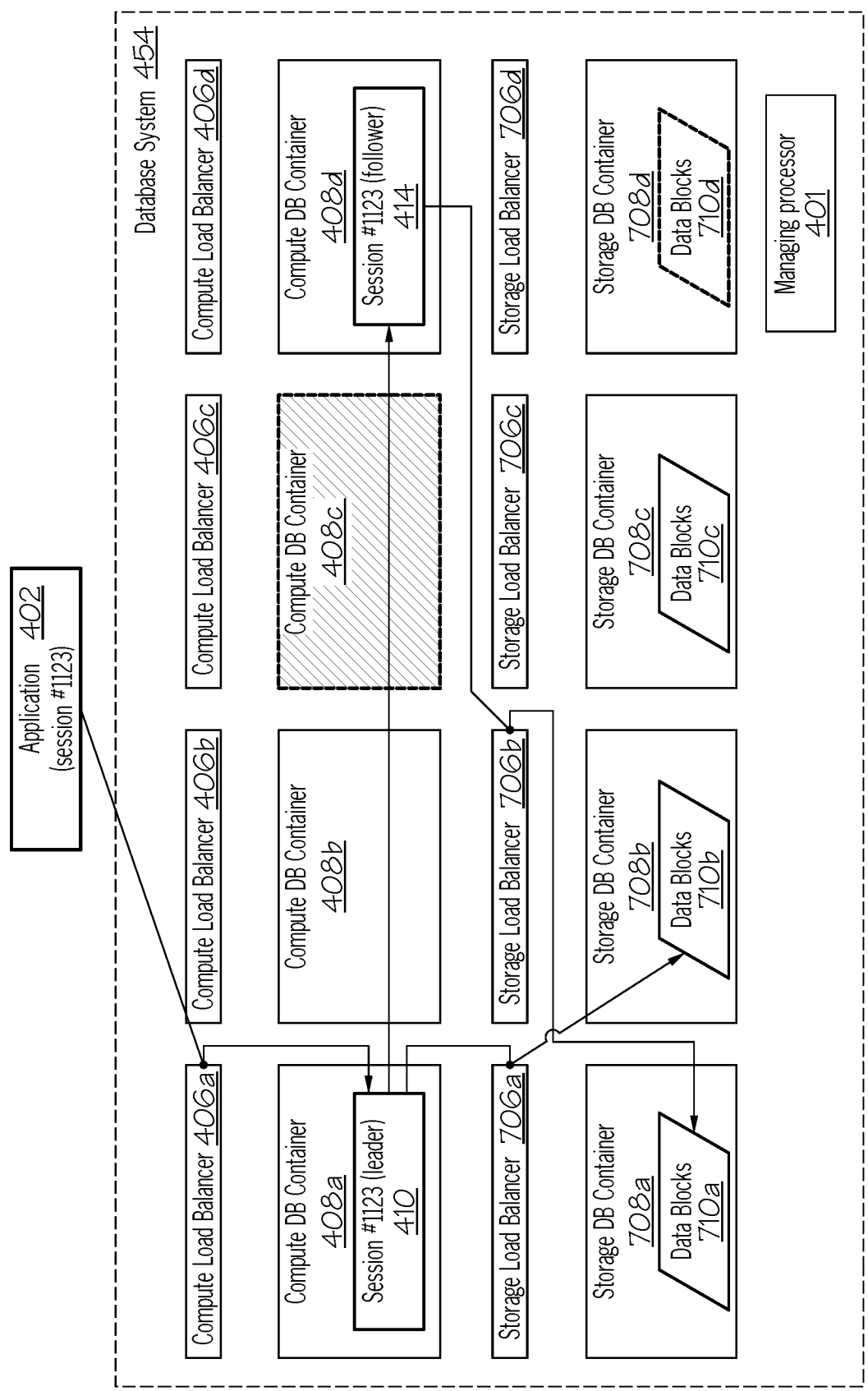

As shown in FIG. 9, the reconfiguration of session #1123 (follower) 410 into session #1123 (leader) 410, as shown in FIG. 6, handles the reassignment of duties of the compute DB containers. However, there is still no way for any of the compute DB containers 408*a*-408*d* to access the data blocks 710*d*, which were originally accessed by the now-failed compute DB container 408*c*.

Figure 10:
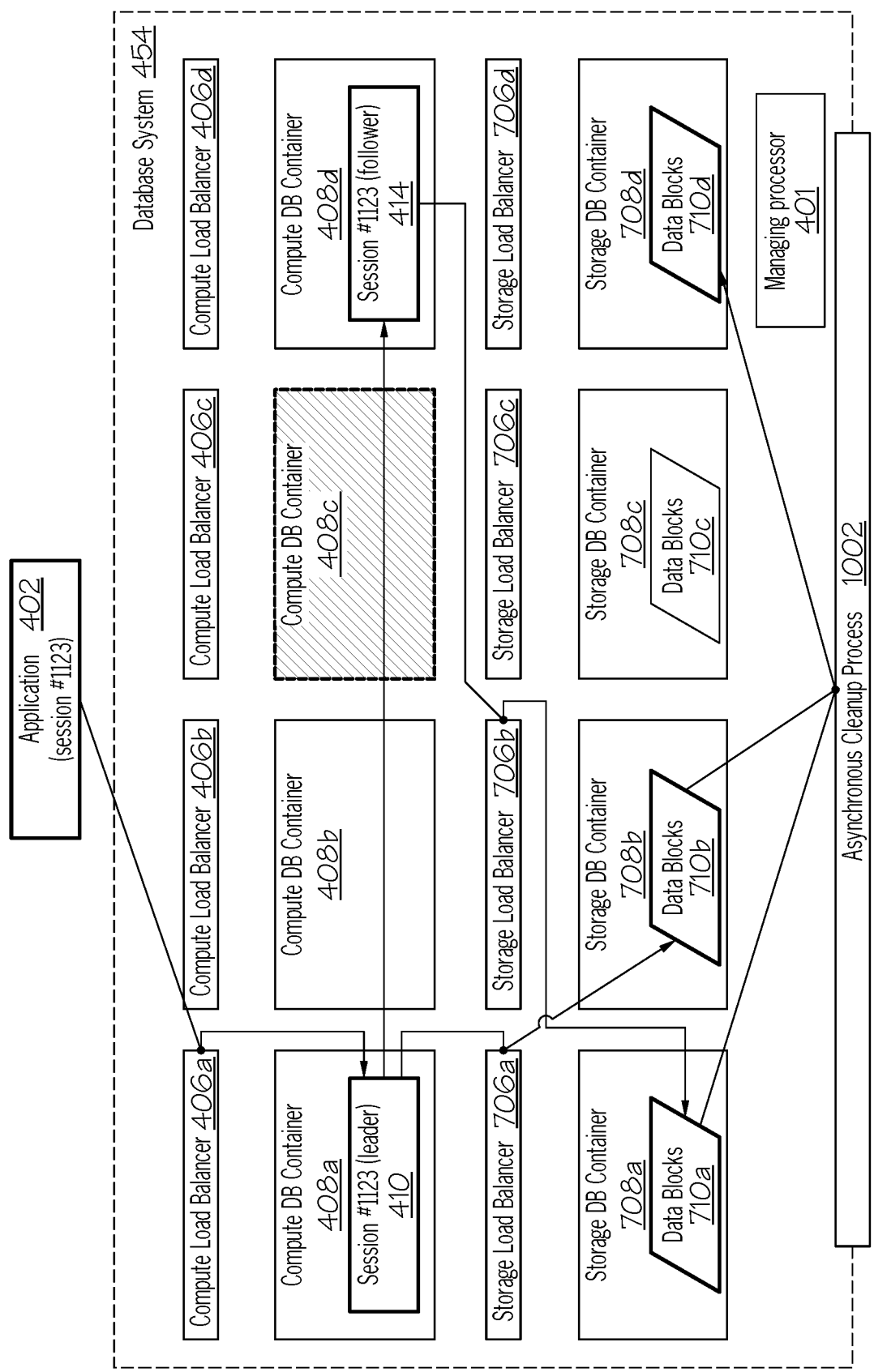

As shown in FIG. 10, an asynchronous cleanup process 1002 address the problem shown in FIG. 9.

Asynchronous cleanup process 1002 (e.g., part of CSML 148 shown in FIG. 1, when incorporated into and executed on behalf of database system 454, such as by managing processor 401) performs several functions.

First, asynchronous cleanup process 1002 ensures that each of the data blocks 710*a*-710*d* are replica images of one another. This allows any of the data blocks 710*a*-710*d* to be used when reconfiguring the database system 454 after the failure of compute DB container 408*c*.

Second, asynchronous cleanup process 1002 assigns a particular storage load balancer from the storage load balancers 706*a*-706*d* to one or more of the storage DB containers 708*a*-708*d* and/or the data blocks 710*a*-710*d* contained therein. This allows the database system 454 to be reconfigured such that use of the failed compute DB container 408*c* is avoided.

Third, asynchronous cleanup process 1002 assigns each of the compute DB containers 408*a*-408*d* and/or the leader/follower sessions contained therein to a particular storage load balancer from the storage load balancers 708*a*-708*d*, thus enabling the reconfiguration of the database system 454.

Fourth, asynchronous cleanup process 1002 optionally creates a new session between application 402 and database system 454, as described in FIG. 11.

Thus, as shown in FIG. 11, assume that compute DB container 408*c* has failed. However, asynchronous cleanup process 1002 has worked around this problem by first designating compute DB container 408*d* as the session #1124 (or else session #1123, if a new session was not created) leader 1112. Likewise, the asynchronous cleanup process 1002 designates the compute DB container 408*a* as the session #1124 (follower) 1110, and compute DB container 408*b* as the session #1124 (follower) 1114 of session #1124 (leader) 1112.

The asynchronous cleanup process 1002 assigns each of the session #1124 (leader) 1112, session #1124 (follower) 1110, and session #1124 (follower) 1114 to one or more of the storage load balancers 706*a*-706*d*. As shown in FIG. 11, in one or more embodiments of the present invention, two of the sessions can be assigned to a same storage load balancer 708*c*.

This assignment of particular compute DB containers (and their sessions) to particular storage load balancers allows each unique session to access certain data blocks, including the previously inaccessible data blocks 710*d*.

Thus, database system 454 is now reconfigured to allow the application 402 to access all requisite container resources, despite the failure of compute DB container 408*c*.

Figure 12:
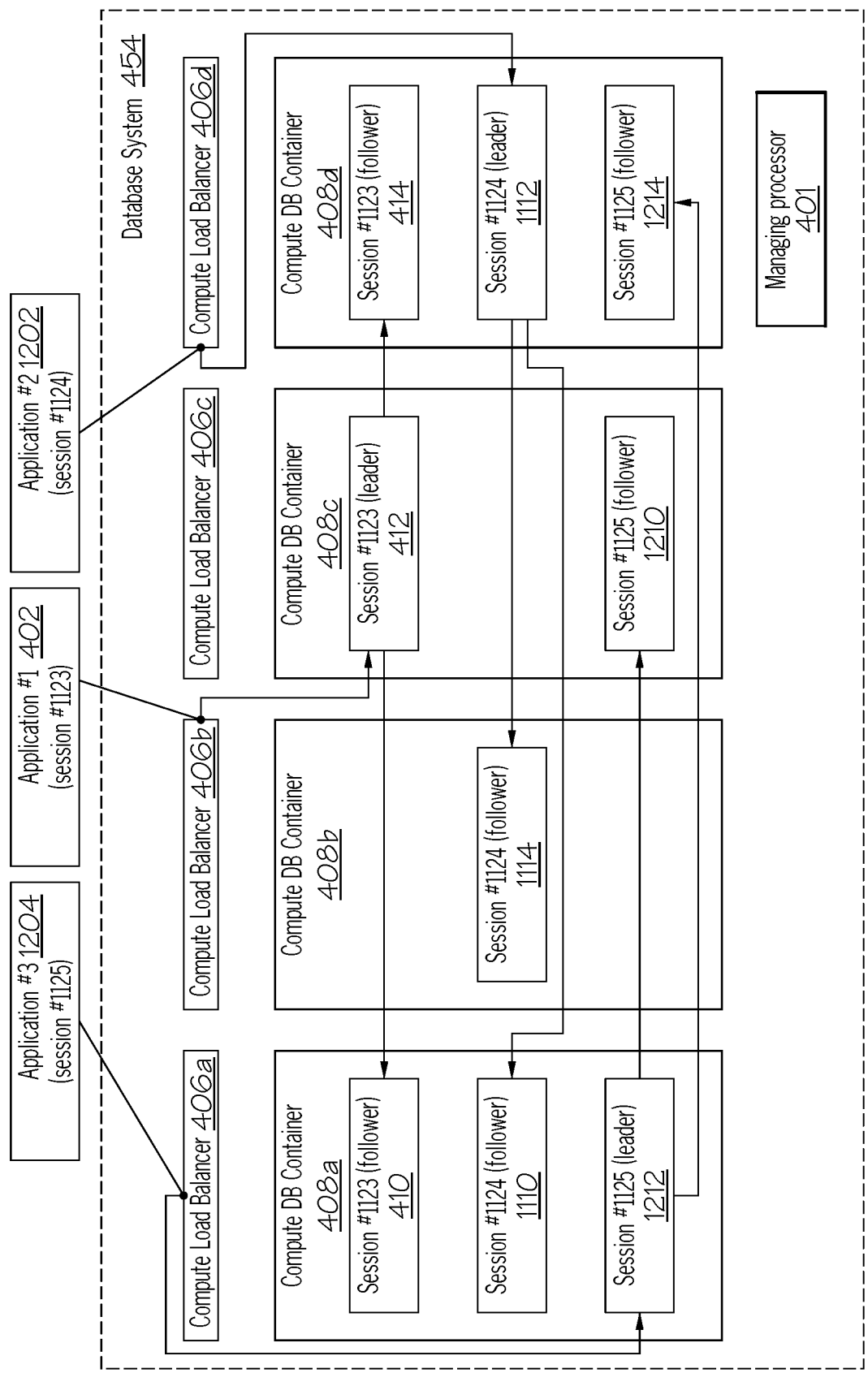
FIG. 12 illustrates concurrent processing of multiple sessions in accordance with one or more embodiments of the present invention.

As shown in FIG. 12, the process described above also works during concurrent processing of multiple sessions. For example, assume that three applications (Application #1—402; Application #2—1202; and Application #3—1204) are running concurrently in the compute DB containers 408*a*-408*d* described above.

As such, if session #1123 (leader) 412 and/or session #1124 (leader) 1112 were to fail, as described above, then a session (follower) will take over their role and functionality, as described above. Similarly, if yet another session #1125 (leader) 1212 were to fail, then one of the session #1125 (follower) 1210 or session #1125 (follower) 1214 would take over as leader, using a process similar to that describe in the preceding figures.

Thus, even though a compute DB container and its associated leader session fails, one or more embodiments of the present invention provide a process for a database system to be reconfigured, such that not only is the leader session reproduced, but access to the data blocks use by and/or managed by the failed leader session is restored by the reproduced leader session.

Figure 13:
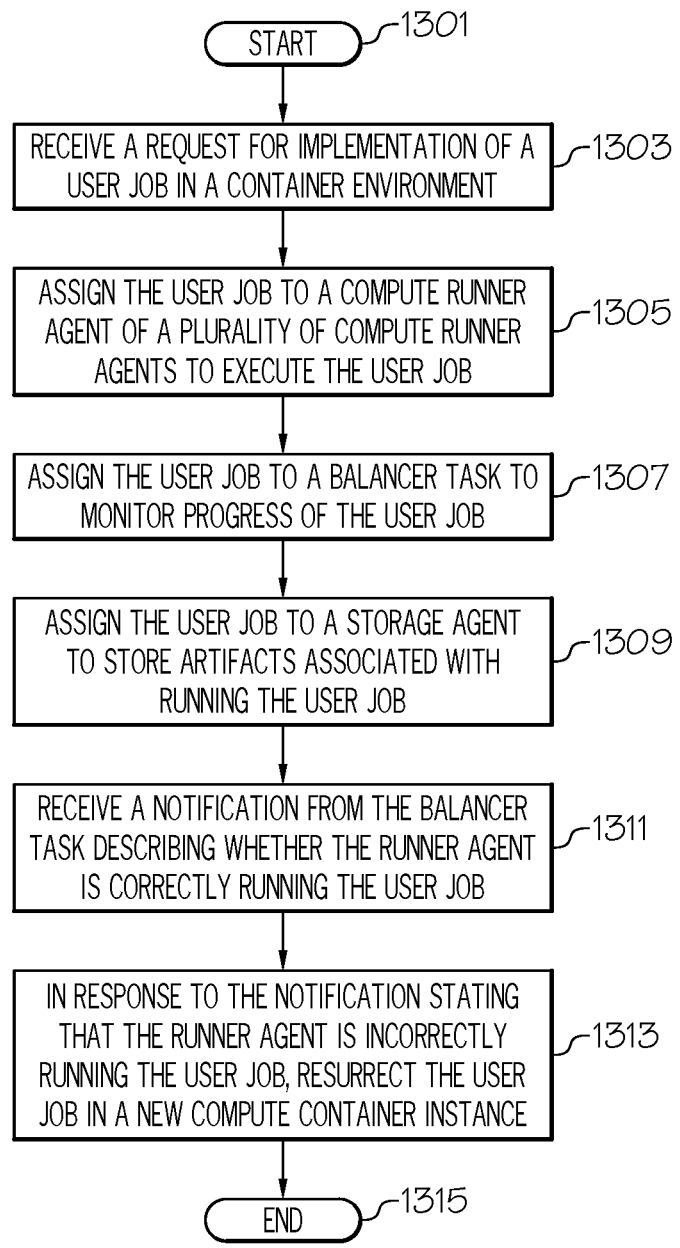
FIG. 13 a high-level flow chart of a method performed in one or more embodiments of the present invention.

With reference now to FIG. 13, a high-level flow chart of steps performed by one or more embodiments of the present invention is presented.

After initiator block 1301, a computing device (e.g., managing processor 401 and/or processor 104 when utilized by compute load balancer 406*b* shown in FIG. 4) receives a request for implementation of a user job (e.g., application 402 shown in FIG. 4) in a container environment (e.g., database system 404 shown in FIG. 4), as described in block 1303.

As described in block 1305, a computing device (e.g., managing processor 401 and/or processor 104 when utilized by compute load balancer 406*b* shown in FIG. 4) assigns the user job to a compute runner agent (e.g., session #1123 (leader) 412 shown in FIG. 4) of a plurality of compute runner agents to execute the user job. As described herein, each compute runner agent is associated with a compute container instance (e.g., one or more of the compute DB containers 408*a*-408*d* shown in FIG. 4) having a unique compute container identifier (e.g., session #1123) corresponding to the user job.

As described in block 1307, a computing device (e.g., managing processor 401 shown in FIG. 4) assigns a balancer task (e.g., part of one or more of the compute load balancers 406*a*-406*d* shown in FIG. 4) to monitor progress of the user job. As shown in FIG. 4, each balancer task is associated with a specific container instance.

As described in block 1309, a computing device assigns the user job to a storage agent (e.g., one or more of the storage load balancers 706*a*-706*d* shown in FIG. 7) to store artifacts (e.g., one or more of the data blocks 710*a*-710*d* shown in FIG. 7) associated with running the user job. As shown in FIG. 7, each storage agent is associated with one or more of the compute container instances (e.g., compute DB containers).

As described in block 1311, a computing device (e.g., managing processor 401) receives a notification from the balancer task describing whether the runner agent (e.g., session #1123 (leader) 412, session #1123 (follower) 410, or session #1123 (follower) 414 shown in FIG. 4) is correctly running the user job. That is, while one or more embodiments of the present invention have been directed to handling the failure of a session #1123 (leader) 412, the processes described herein are also applicable when handling a failure of a session #1123 (follower) 410 or a session #1123 (follower) 414 shown in FIG. 4.

As described in block 1313, in response to the notification stating that the runner agent is incorrectly running the user job, a computing device (e.g., the managing processor 401 executing the asynchronous cleanup process 1002 shown in FIG. 10) resurrects the user job in a new compute container instance (e.g., compute DB container 408*b* replaces failed compute DB container 408*c*), as described in FIG. 4-FIG. 11.

The flow-chart ends at terminator block 1315.

In one or more embodiments of the present invention, the compute runner agent and the storage agent is a same agent. For example, session #1123 (leader) 1112 shown in FIG. 11 not only manages the compute operations in compute DB container 408*d*, but also manage operations in storage DB container 708*b*.

In one or more embodiments of the present invention, the compute runner agent and the storage agent are different agents. For example, session #1123 (leader) 1112 shown in FIG. 11 just manages the compute operations in compute DB container 408*d*, while another session agent (i.e., a storage session agent—not shown) manage operations in storage DB container 708*b*.

In one or more embodiments of the present invention, the user job is assigned to the compute runner agent (e.g., session #1124 (leader) 1112 shown in FIG. 11) by a compute load balancer (e.g., compute load balancer 406*c*).

In one or more embodiments of the present invention, the compute container instance (e.g., compute DB container 408*c* shown in FIG. 12) is assigned one or more sessions from different user jobs (e.g., session #1123 from Application #1 and session #1125 from Application #3).

In one or more embodiments of the present invention, the compute container instance is assigned one or more sessions by different compute load balancers. That is, the different compute load balancers 406*a*-406*d* shown in FIG. 4 assign the session #1123 to one or more of the compute DB containers 408*a*-408*d* shown in FIG. 4.

In one or more embodiments of the present invention, the compute runner agent, the compute container, the balancer task, the storage agent, and the new compute container instance operate in a cloud computing environment. That is, the session leaders/followers (compute runner agents), the compute DB containers (computer container), the compute load balancers (balancer task) and storage agents (e.g., session #1123 (leader) 412) all operate within a cloud architecture, thus making them available on-demand to the user.

In one or more embodiments of the present invention, a computing device (e.g., managing processor 401 shown in FIG. 4) determines that all tasks for the user job are complete. In response to determining that all tasks for the user job are complete, the computing device communicates a task completion status message to the compute runner agent (e.g., session #1123 (leader) 412), and then consolidates all artifacts (i.e., computational output) of the plurality of compute runner agents from a session associated with a user job (e.g., using the asynchronous cleanup process 1002 and the managing processor 401 shown in FIG. 10). This consolidation of the artifacts spans a spectrum of choices from promotion of all of the artifacts to only one artifact (i.e., the outputs are all consolidated). In response to consolidating the artifacts, the computing device communicates a notice of the completion of the user job to all users of the container environment that was used by the user job. That is, the users are notified that the user job was completed only after all outputs are consolidated.

In one or more embodiments of the present invention, a computing device (e.g., managing processor 401) assigns multiple sessions having multiple roles to a single compute container; and determines that all of the two or more sessions have ended. In response to determining that all of the two or more sessions have ended, leader agents for the user job terminate all follower agents of the leader agents. In response to terminating all follower agents of the leader agents, the computing device deletes all data artifacts created by the leader agents. In response to determining that all of the two or more sessions have ended, the computing device stores a record of all transactions performed for the user job.

That is, once the job is complete, all artifacts are erased (for security reasons), but a record of what instructions were executed and the data that was used and/or output from the execution of the instructions is saved (for future reconstruction purposes).

In one or more embodiments of the present invention, one or more of the compute load balancers identify one or more compute runner agents for the user job that terminated before the user job completed (e.g., session #1123 (leader) 412 shown in FIG. 4). The computing device then resurrects all terminated compute runner agents that terminated before the user job completed from a last known state of the user job. That is, states of a user job (e.g., contents of buffers/registers, instruction pointers to a last known executed instruction, etc.) are used to reconstruct/resurrect terminated compute runner agents that failed before that point. Thus, if the failure of a particular compute runner agent was caused by the failure of a compute DB container, then that failed compute runner agent can be resurrected/reconstructed to run on an operational compute DB container by using the program state data (contents of buffers/registers, pointers to last known executed instruction, etc.) for that application.

In one or more embodiments of the present invention, a quantity of compute runner agents and a quantity of compute load balancers is determined by a service level agreement (SLA) associated with the user job. That is, a SLA determines how many compute DB containers (compute DB containers 408a-408d) and computer load balancers (compute load balancers 406a-406d) are available to a particular user, client computer, and/or application.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 14:
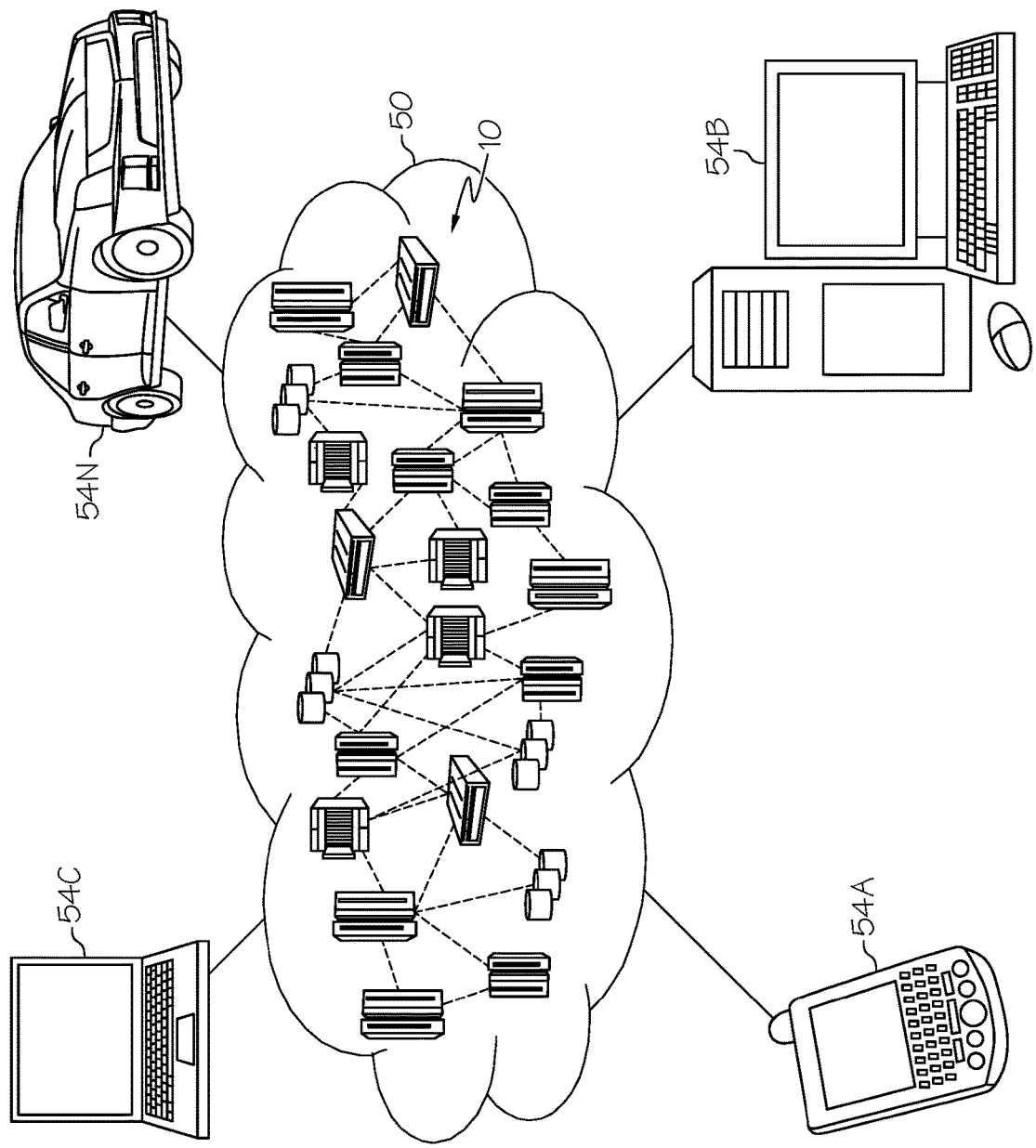
FIG. 14 depicts a cloud computing environment according to an embodiment of the present invention.

Referring now to FIG. 14, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 14 are intended to be illustrative only and that computing nodes 10 and cloud computing environment 50 can communicate with any type of computerized device over any type of network and/or network addressable connection (e.g., using a web browser).

Figure 15:
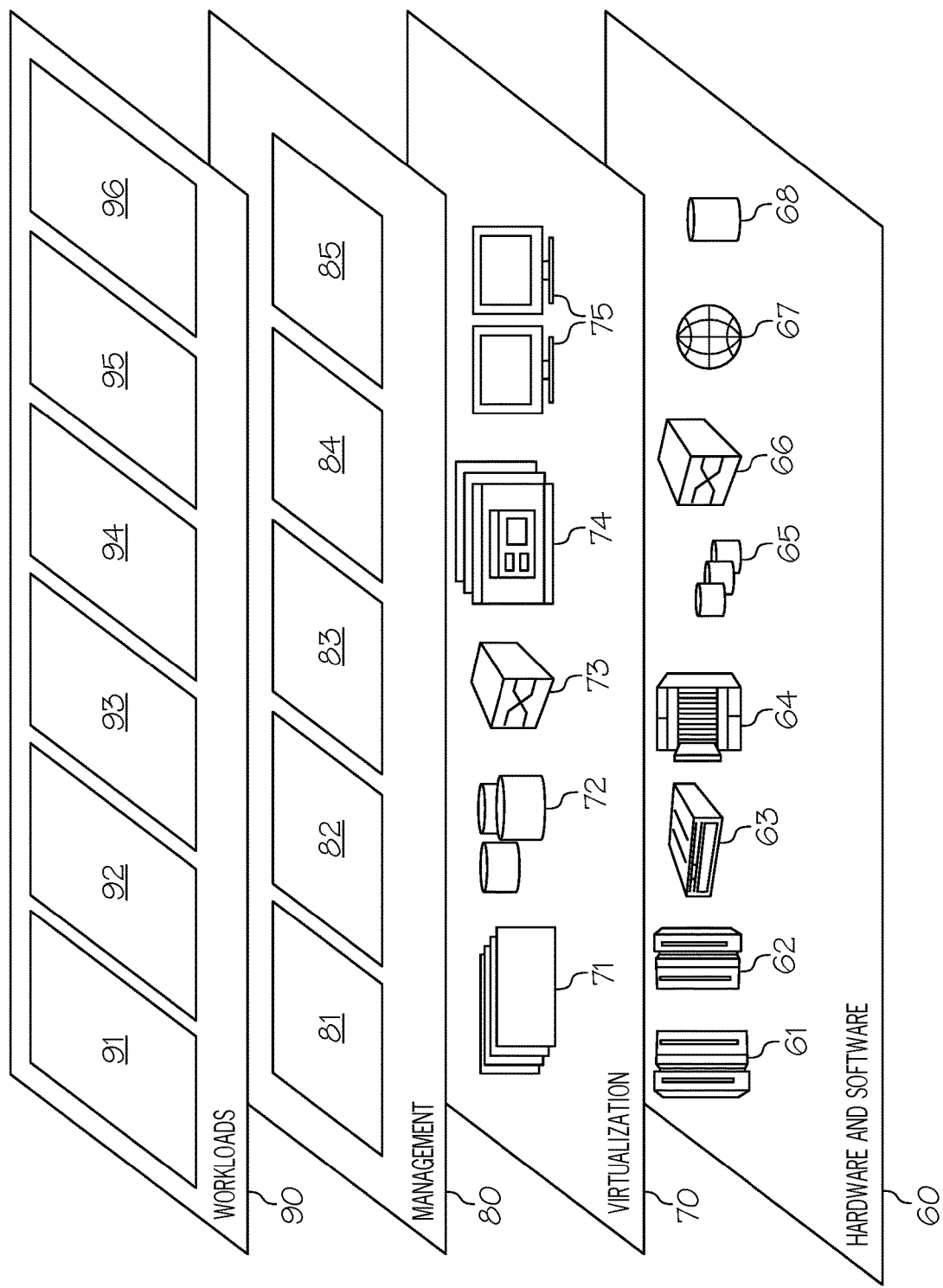
FIG. 15 depicts abstraction model layers of a cloud computer environment according to an embodiment of the present invention.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and container services persistency processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of making container services persistently available to a user job, the method comprising:
   receiving, by a computing device, a request for implementation of a user job in a container environment;
   assigning, by a computing device, the user job to a compute runner agent of a plurality of compute runner agents to execute the user job, wherein each compute runner agent is associated with a compute container instance having a unique compute container identifier corresponding to the user job, wherein the compute container instance associated with the computer agent assigned the user job is designated as a lead compute container instance and other compute container instances are designated as follower compute container instances that mirror a state of the lead compute container instance, and wherein each compute container instance is associated with a storage load balancer providing access to data blocks that replica data;
   assigning, by a computing device, the user job to a balancer task to monitor progress of the user job, wherein the balancer task is associated with the container instance;
   assigning, by a computing device, the user job to a storage agent to store artifacts associated with running the user job, wherein the storage agent is associated with the compute container instance;
   receiving, by a computing device, a notification from the balancer task describing whether the compute runner agent is correctly running the user job; and
   in response to the notification stating that the compute runner agent is incorrectly running the user job and making the data blocks associated with the compute runner agent inaccessible, resurrecting, by a computing device, the user job in a new compute container instance, wherein resurrecting the user job further comprises reconfiguring the plurality of compute runner agents such that the new compute container instance is designated as the lead compute container instance for executing the user job and the other compute container instances are designated as the follower compute container instances, and assigning one or more storage load balancers to the new compute container instance such that the new compute container instance is provided access to data from the data blocks that are inaccessible due to the computer runner agent incorrectly running the user job.

2. The method of claim 1, wherein the compute runner agent and the storage agent is a same agent.

3. The method of claim 1, wherein the compute runner agent and the storage agent are different agents.

4. The method of claim 1, wherein the user job is assigned to the compute runner agent by a compute load balancer.

5. The method of claim 1, wherein the compute container instance is assigned one or more sessions from different user jobs.

6. The method of claim 1, wherein the compute container instance is assigned one or more sessions by different compute load balancers.

7. The method of claim 1, wherein the compute runner agent, the compute container, the balancer task, the storage agent, and the new compute container instance operate in a cloud computing environment.

8. The method of claim 1, further comprising:
   determining, by a computing device, that all tasks for the user job are complete;
   in response to determining that all tasks for the user job are complete, communicating, by a computing device, a task completion status message to the compute runner agent;
   consolidating, by a compute runner agent, all artifacts of the plurality of compute runner agents from a session associated with a user job, wherein consolidating the artifacts spans a spectrum of choices from promotion of all of the artifacts to only one artifact; and
   in response to consolidating the artifacts, communicating, by a computing device, a notice of the completion of the user job to all users of the container environment that was used by the user job.

9. The method of claim 1, further comprising:
   assigning, by a computing device, two or more sessions having multiple roles to a single compute container;
   determining, by a computing device, that all of the two or more sessions have ended;
   in response to determining that all of the two or more sessions have ended, terminating, by leader agents for the user job, all follower agents of the leader agents;
   in response to terminating all follower agents of the leader agents, deleting all data artifacts created by the leader agents; and
   in response to determining that all of the two or more sessions have ended, storing a record of all transactions performed for the user job.

10. The method of claim 1, further comprising:
    identifying, by one or more compute load balancers, one or more compute runner agents for the user job that terminated before the user job completed; and
    resurrecting, by a computing device, all terminated compute runner agents that terminated before the user job completed from a last known state of the user job.

11. The method of claim 1, wherein a quantity of compute runner agents and a quantity of compute load balancers is determined by a service level agreement (SLA) associated with the user job.

12. A computer program product comprising a computer readable storage medium having program code embodied therewith, wherein the computer readable storage medium is not a transitory signal per se, wherein the program code is readable and executable by a processor to perform a method of making container services persistently available to a user job, and wherein the method comprises:

receiving a request for implementation of a user job in a container environment;

assigning the user job to a compute runner agent of a plurality of compute runner agents to execute the user job, wherein each compute runner agent is associated with a compute container instance having a unique compute container identifier corresponding to the user job, wherein the compute container instance associated with the computer agent assigned the user job is designated as a lead compute container instance and other compute container instances are designated as follower compute container instances that mirror a state of the lead compute container instance, and wherein each compute container instance is associated with a storage load balancer providing access to data blocks that replica data;

assigning the user job to a balancer task to monitor progress of the user job, wherein the balancer task is associated with the container instance;

assigning the user job to a storage agent to store artifacts associated with running the user job, wherein the storage agent is associated with the compute container instance;

receiving a notification from the balancer task describing whether the compute runner agent is correctly running the user job; and in response to the notification stating that the compute runner agent is incorrectly running the user job and making the data blocks associated with the compute runner agent inaccessible, resurrecting the user job in a new compute container instance, wherein resurrecting the user job further comprises reconfiguring the plurality of compute runner agents such that the new compute container instance is designated as the lead compute container instance for executing the user job and the other compute container instances are designated as the follower compute container instances, and assigning one or more storage load balancers to the new compute container instance such that the new compute container instance is provided access to data from the data blocks that are inaccessible due to the computer runner agent incorrectly running the user job.

13. The computer program product of claim 12, wherein the computer runner agent and the storage agent is a same agent.

14. The computer program product of claim 12, wherein the compute runner agent and the storage agent are different agents.

15. The computer program product of claim 12, wherein the user job is assigned to the compute runner agent by a compute load balancer.

16. The computer program product of claim 12, wherein the program code is provided as a service in a cloud environment.

17. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

receiving a request for implementation of a user job in a container environment;

assigning the user job to a compute runner agent of a plurality of compute runner agents to execute the user job, wherein each compute runner agent is associated with a compute container instance having a unique compute container identifier corresponding to the user job, wherein the compute container instance associated with the computer agent assigned the user job is designated as a lead compute container instance and other compute container instances are designated as follower compute container instances that mirror a state of the lead compute container instance, and wherein each compute container instance is associated with a storage load balancer providing access to data blocks that replica data;

assigning the user job to a balancer task to monitor progress of the user job, wherein the balancer task is associated with the container instance;

assigning the user job to a storage agent to store artifacts associated with running the user job, wherein the storage agent is associated with the compute container instance;

receiving a notification from the balancer task describing whether the compute runner agent is correctly running the user job; and in response to the notification stating that the compute runner agent is incorrectly running the user job, resurrecting the user job in a new compute container instance and making the data blocks associated with the compute runner agent inaccessible, resurrecting the user job in a new compute container instance, wherein resurrecting the user job further comprises reconfiguring the plurality of compute runner agents such that the new compute container instance is designated as the lead compute container instance for executing the user job and the other compute container instances are designated as the follower compute container instances, and assigning one or more storage load balancers to the new compute container instance such that the new compute container instance is provided access to data from the data blocks that are inaccessible due to the computer runner agent incorrectly running the user job.

18. The computer system of claim 17, wherein the compute runner agent and the storage agent is a same agent.

19. The computer system of claim 17, wherein the compute runner agent and the storage agent are different agents.

20. The computer system of claim 17, wherein the stored program instructions are provided as a service in a cloud environment.

* * * * *